US005537820A

United States Patent [19]

Beale et al.

[11] Patent Number: 5,537,820

[45] Date of Patent: Jul. 23, 1996

[54] FREE PISTON END POSITION LIMITER

[75] Inventors: William T. Beale; Nicholas R. van der Walt; Reuven Z. Unger, all of Athens, Ohio

[73] Assignee: Sunpower, Inc., Athens, Ohio

[21] Appl. No.: 265,790

[22] Filed: Jun. 27, 1994

[51] Int. Cl.[6] .......... F01B 29/10; F04B 17/04; F16K 31/365

[52] U.S. Cl. .......... 60/517; 60/520; 417/417; 137/510; 137/907

[58] Field of Search .......... 60/517, 520, 521, 60/910; 417/417; 137/510, 907

[56] References Cited

U.S. PATENT DOCUMENTS

| | | | |
|---|---|---|---|
| 4,836,757 | 6/1989 | Curwen et al. | 417/416 |
| 5,275,542 | 1/1994 | Terauchi | 417/417 |
| 5,409,035 | 4/1995 | Seoh et al. | 137/907 |

OTHER PUBLICATIONS

*Stirling Engines*, authored by Walker, published 1980 by Claredon Press, Oxford. pp. 270–274.

*Primary Examiner*—Ira S. Lazarus

*Assistant Examiner*—Alfred Basichas

*Attorney, Agent, or Firm*—Frank H. Foster; Kremblas, Foster & Millard

[57] ABSTRACT

A piston end position limiter for a free piston machine of the type having a piston sealingly reciprocating in a cylinder and separating a work space bounded at one end of the piston from a second space bounded at the opposite end of the piston. The work space and the second space contain a working fluid having an average pressure. A first valve is connected in communication between a fluid reservoir and the work space and is adapted to open only when the working fluid pressure varies sufficiently in one direction from its average pressure. A second position responsive valve is connected between the reservoir and the second space and is operatively linked to the piston for opening in response to the piston reaching a selected end limit of its reciprocation.

14 Claims, 4 Drawing Sheets

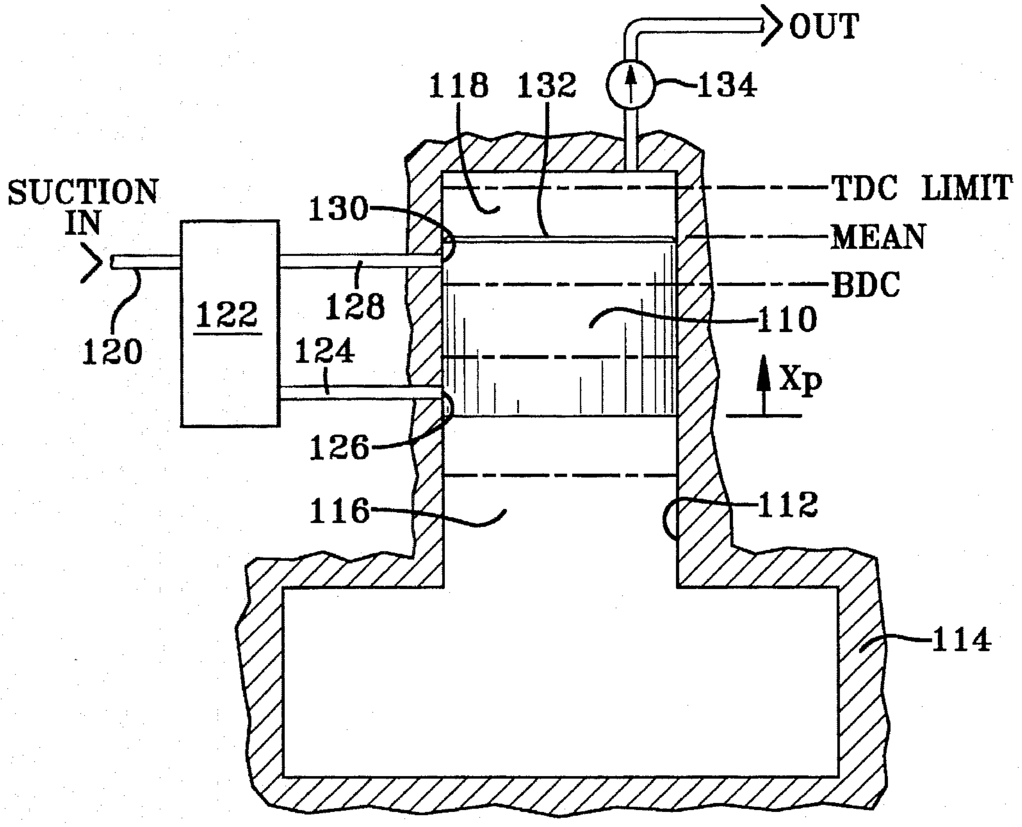
FIG-5
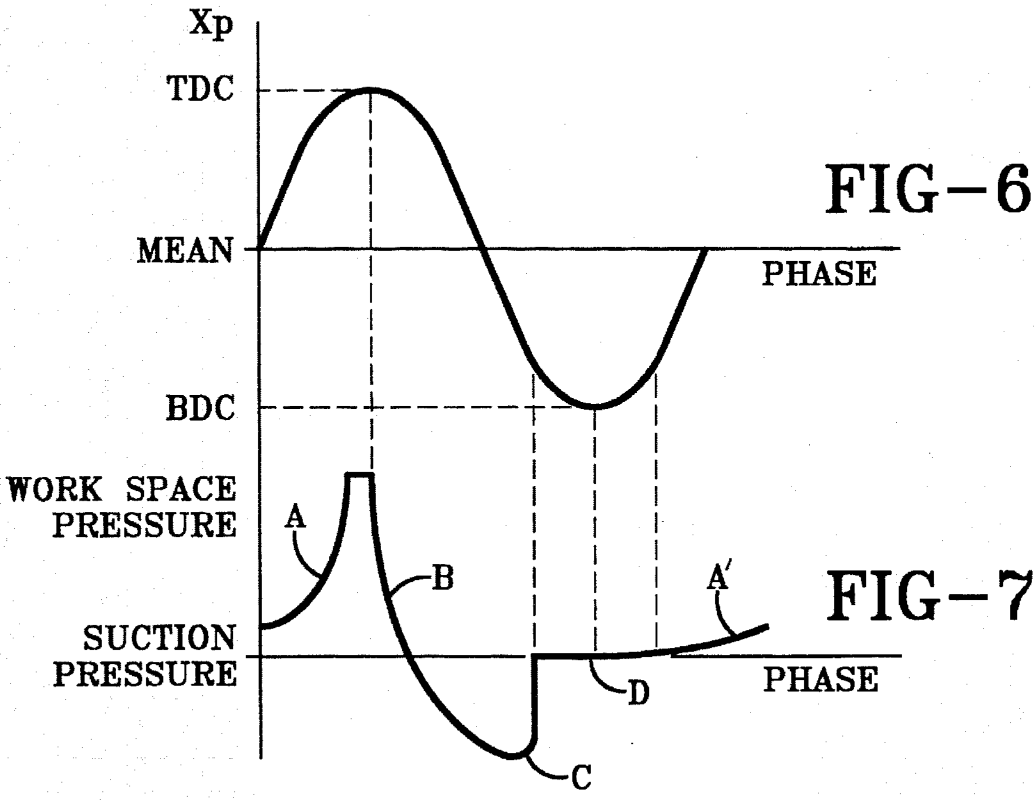
FIG-6
FIG-7

FREE PISTON END POSITION LIMITER

TECHNICAL FIELD

This invention relates generally to apparatus which has a piston freely reciprocating in a cylinder such as compressors and Stirling cycle engines and coolers, and more particularly the invention relates to mechanical structures for limiting the end positions of travel of such a reciprocating free piston.

BACKGROUND ART

Most pistons are connected to a rigid, mechanical link, such as a connecting rod connected to a crank shaft, and are therefore confined to preselected end limits. However, many machines are known which utilize one or more free pistons. A free piston reciprocates in a cylinder without such mechanical connection and therefore a free piston is not mechanically confined to end limits. Such free pistons may be driven by an electromagnetic, linear motor and used, for example, as a gas or other fluid compressor or pump. Free pistons are also found in free piston Stirling cycle machines, such as free piston Stirling engines and cryocoolers. Free pistons sealingly reciprocate in a cylinder formed in a housing. The housing typically encloses a work space bounded by one end of the piston and a second space or back space bounded by the opposite end of the piston. The free piston makes excursions from a mean position in opposite directions to a bottom dead center (BDC) position and a top dead center (TDC) position. The amplitude of these excursions from the mean position varies as a function of the operating conditions of the machine, such as the work demand, load or gas pressures. The piston displacement from the mean position is approximately a sinusoidal function of time or angle. The amplitude of a piston's reciprocation is the displacement from the mean position to the BDC position or to the TDC position. The distance from the BDC position to TDC position is the piston's stroke.

Not only do changes in the operating conditions of the machine cause variations in the amplitude of the piston excursions, but such changes also cause variations or creep of the mean position. Variations in the mean position may result, for example, from non-symmetrical variations of the pressures to which the piston is exposed as a function of time and the resulting non-symmetrical leakage of working fluid past the piston seals.

Typically the first or work space and the second or back space volumes experience fluid pressure variations as a function of time about an average pressure. Typically the back space pressure variations as a function of time are smaller and more nearly sinusoidal than the pressure variations in the work space. The result of assymmetrical pressure variations as a function of time in the work space and the non-symmetrical leakage past the piston, is to cause a net leakage of working fluid from one space to the other, most commonly from the work space into the second or back space. Thus, although during each cycle minute quantities of gas will leak first in one direction and then in the other, the leakages in opposite directions are typically not equal and therefore result in a small net transfer of gas from one space to the other during each cycle. This gas transfer between the spaces gradually accumulates and consequently causes the mean position of the free piston to creep toward one end or the other, typically creeping inwardly toward the work space.

In summary, although both the first and second spaces each experience pressure variations as a function of time, about an average pressure, a net leakage in one direction, such as from the first space to the second space, causes a net migration or creep of the mean position of the piston in the opposite direction, such as from the second space toward the first space. Thus, even if the amplitude of oscillation remains constant, a sufficient creep may eventually cause the piston to collide with a bounding structure, such as the valve plate of a compressor, the heat exchanger of a Stirling engine or the displacer of a Stirling engine. Similarly, even if the mean position remains unchanged, an increase in the amplitude of oscillation, caused for example by a reduced load demand, can likewise cause such a collision.

There is therefore a need for an end limiting structure which limits the end position of the reciprocating free piston in order to maintain a selected clearance between the piston and other bounding structures. For example, in a free piston compressor it is desirable that the piston approach the valve plate as closely as possible at a minimum clearance, sometimes on the order of hundredths of a millimeter, in order to operate the compressor at a maximum compression ratio and therefore at maximum efficiency. However, it is also necessary to assure that the piston cannot travel any further toward the valve plate so that destruction of the machine by collision with the valve plate is avoided. Alternatively, it is sometimes desirable for thermodynamic reasons to limit the end position of a free piston.

It is a further object and feature of the present invention to maintain the end limit for the piston position over a wide range of stroke or amplitude of piston reciprocation, as well as over a wide range of mean position for the reciprocating piston as operating conditions vary, such as by a demand for a greater or lesser refrigerant flow rate, a change in refrigerant pressure or a demand for more or less work by a Stirling engine or a demand for a higher or lower thermal pumping rate by a Stirling cooler.

BRIEF DISCLOSURE OF INVENTION

In the present invention a first valve is connected in communication between a fluid reservoir and the first space. The first valve is adapted to open only when the working fluid pressure in the first space varies sufficiently in one direction from its average pressure, that is when the pressure is sufficiently greater or smaller than the average pressure. A second, position-responsive valve is connected in continuously open fluid communication to the same reservoir and is also connected to the second space. This second, position-responsive valve, when open, connects the reservoir to the second space. The second valve is operatively linked to the piston for opening the second valve to connect the second space to the reservoir in response to the piston reaching a selected end limit of its reciprocation.

BRIEF DESCRIPTION OF DRAWINGS

FIG. 5 is a diagrammatic illustration of a compressor having the end position of its piston limited by an embodiment of the invention utilizing no check valves.

FIG. 6 is an oscillogram illustrating the displacement of the piston of the embodiment of FIG. 5 as a function of phase angle or time.

FIG. 7 is an oscillogram illustrating the pressure in the work space of the embodiment of FIG. 5 as a function of phase or time.

Figure 1:
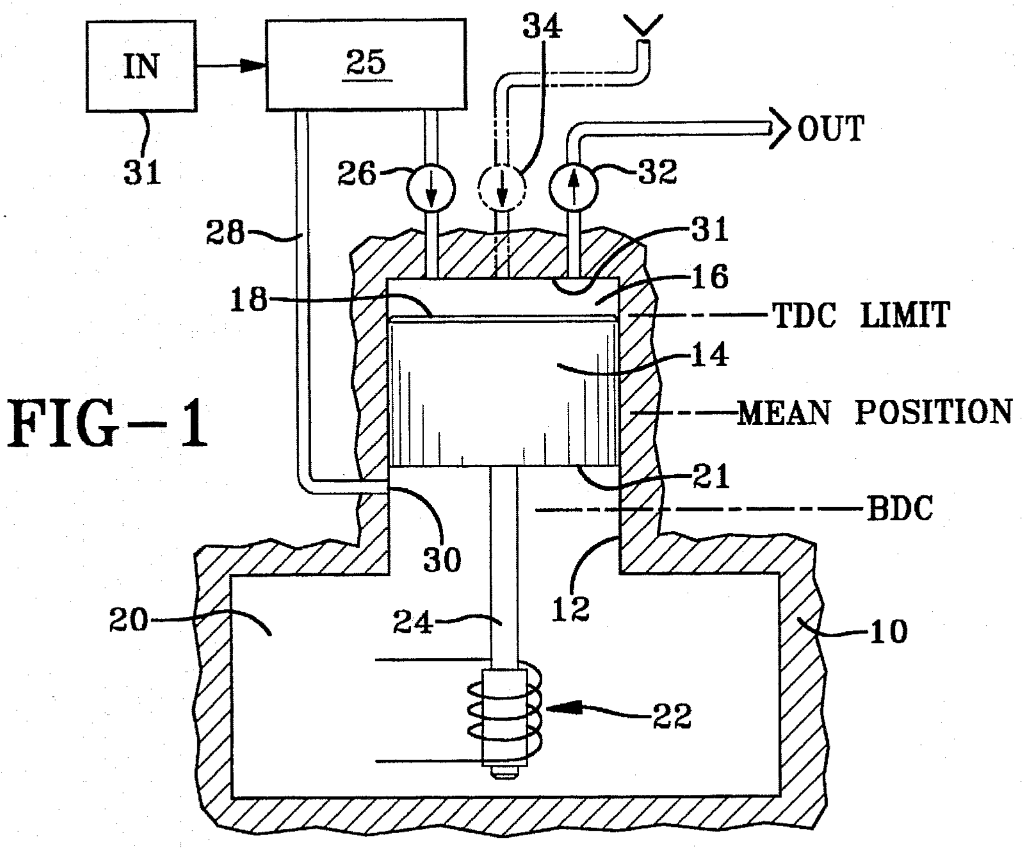
FIG. 1 is a diagrammatic illustration of a free piston compressor embodying the present invention limiting the inward movement of the piston toward the work space.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art.

DETAILED DESCRIPTION

The various embodiments of the present invention are illustrated diagrammatically in the drawings because the physical structures of the present invention, such as passageways, ports, chambers, pistons, housings, and various valves, are all well known in the prior art. Furthermore, the structures of the present invention involve only a very minor portion of the machines into which they are incorporated and therefore the other details of the machines, which are all well known in the art, are not described.

FIG. 1 illustrates an embodiment of the invention. It has a housing 10 with a cylinder 12 and a piston 14 sealingly reciprocating in the cylinder 12. The housing 10 encloses a work space 16 bounded by a first end 18 of the piston 14. The work space 16 is the volume into which gas is drawn and then compressed. The housing 10 also has a second space 20, sometimes referred to as a back space or outer volume which is bounded by the second end 21 of the piston 14. The piston 14 is driven in reciprocation by an electromagnetic linear motor 22 connected to the piston by a connecting rod 24. The linear motor 22 is a conventional electromagnetic linear motor to which a time varying, electrical potential is applied for driving an internal, permanent magnet, which is mounted to the rod 24, in reciprocation.

A fluid reservoir 25 is connected through a first valve 26, which is a check valve, to the work space 16. The check valve 26 opens only when the working fluid pressure from the work space 16 is sufficiently less than the average pressure in the work space 16. In FIG. 1, because the first valve is a check valve, it opens whenever the work space pressure is less than the pressure in reservoir 25. Consequently, the first valve 26 maintains the reservoir 25 at a pressure below the average pressure of the work space 16 and preferably and typically near the minimum work space pressure during the cycle.

The reservoir 25 is also connected through a passageway 28 to a port 30 through the wall of cylinder 12 and therefore opening into the cylinder 12. The port 30 is placed at a position along the cylinder wall so that the port 30 is beyond and uncovered by the piston 14 and exposed to the second space 20 when the piston 14 reaches the selected inward end limit. In the embodiment of FIG. 1, the port 30 is uncovered when the piston 14 reaches the illustrated TDC limit. The TDC in limit is spaced by a selected clearance from the end wall 31 which represents a valve plate or head. As an example, the port 30, or a slot or groove associated with the port, may have a 0.3 mm axial dimension. The clearance from the TDC position to the end wall 31 may be, for example, 0.05 mm so that the port or beginning of the slot would be spaced 0.05 mm plus the piston length from the collision position with the end wall 31.

In Applicant's terminology convention, movement of the piston inwardly into the work space is referred to as inward movement of the piston and the innermost position of the piston is referred to as the in limit. Similarly, movement toward the second space 20 is referred to as outward movement and the limit of outward movement is referred to as the out limit.

The reservoir 25 may be connected to a source 31 of fluid being compressed by the compressor of FIG. 1 and consequently may simultaneously serve as both the low pressure suction chamber of the compressor and the reservoir of the invention. Consequently, gas drawn into the work space 16 to be compressed is also drawn through the check valve 26. Compressed gas is then exhausted through a check valve 32 in the conventional manner. Alternatively, however, the reservoir 25 may be dedicated to the in limiting purposes of the invention and an alternative input connection through a check valve 34 may be provided in the conventional manner.

In the operation of the embodiment of FIG. 1, the reservoir 25 is maintained at a relatively low pressure below the average pressure of the work space 16, and preferably near the lowest pressure which the work space reaches during reciprocation of the piston. If the piston does not reach the TDC end limit illustrated in FIG. 1, the port 30 remains covered during the entire cycle and reservoir 25 is maintained at the low pressure. In the event the piston 14 reaches the TDC in limit, the port 30 is uncovered and working fluid is drawn from the second space 20 through the passageway 28 into the reservoir 25 because the reservoir 25 is maintained by the check valve 26 at a sufficiently low pressure. The pressure in the reservoir 25 is well below the pressure in the second space because the amplitude of the pressure variations in the work space greatly exceeds the amplitude of pressure variations in the second space and the reservoir is maintained near the minimum work space pressure. This uncovering of the port 30 removes a portion of the fluid from the second space 20 and consequently shifts the mean position of the piston 14 outwardly. Each time the piston reciprocates and reaches the end limit, a minute quantity of fluid is transferred from the second space 20 into the reservoir 25 and ultimately is drawn into the work space 16. Because the port 30 has a finite diameter or other dimension in the axial direction, the port 30 may be only partially uncovered when the piston first begins to reach the TDC inward end limit. During each subsequent reciprocation, the piston may uncover progressively more of the port until an equilibrium is reached by the removal of sufficient fluid during each cycle from the second space into the reservoir and from the reservoir into the work space.

The cooperating port 30 and piston 14 together function as a spool valve and can be provided with grooves in the piston or cylinder in communication with the port 30 in the manner typical for spool valves. The spool valve could alternatively be formed on a separate structure, rather than directly upon the piston, and linked to the piston by an appropriate mechanical linkage.

Similarly, other valves can be used in place of the spool valve arrangement illustrated in FIG. 1. For example, electrically actuated valves could be utilized and mechanically linked to a projection on the moving piston which is connected to a switch so that the electrical valve is opened when the piston reaches the selected end limit. Such electrical valves, however, are also considered needlessly complicated surplus.

Figure 2:
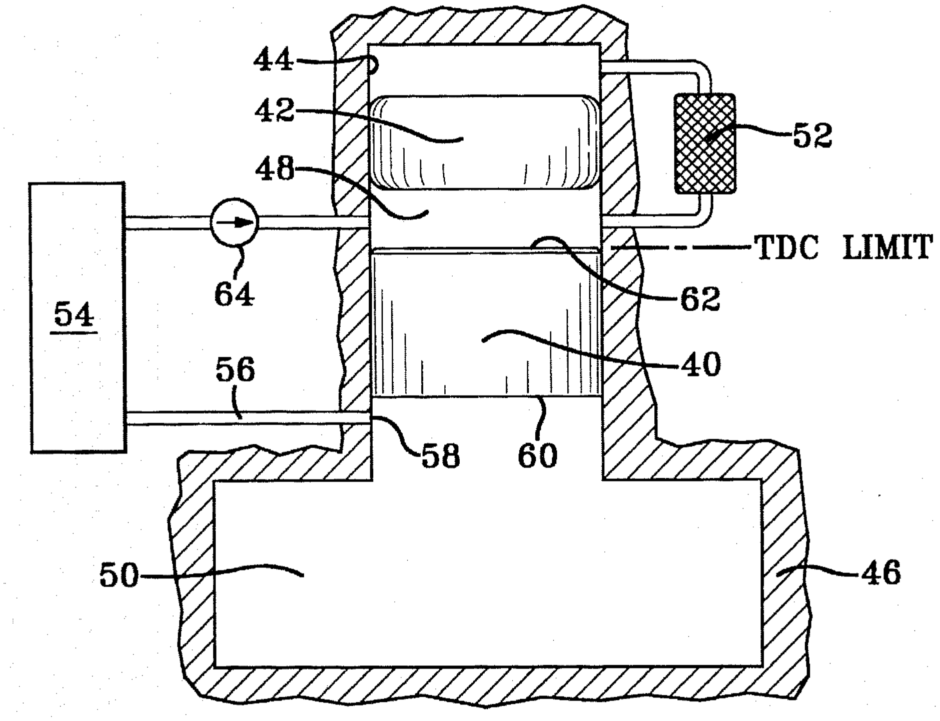
FIG. 2 is a diagrammatic illustration of an embodiment of the invention limiting the inward movement of the power piston toward the work space of a free piston Stirling engine.

FIG. 2 illustrates the invention of FIG. 1 applied to a free piston Stirling machine such as an engine or cooler. The free piston Stirling machine of FIG. 2 has a reciprocating power piston 40 and a displacer 42 both freely reciprocating in a cylinder 44 formed in a housing 46 in the known and conventional manner. The Stirling machine has a conventional work space 48 and a second space 50 separated by the power piston 40. It also has a conventional regenerator 52. For purposes of the present invention, a reservoir 54 is connected through a passageway 56 to a port 58 which is positioned to be uncovered by the second end 60 of the piston 40 when the first end 62 of the piston 40 reaches the selected TDC limit. The reservoir 54 is also connected through a check valve 64 to the work space 48 which, as known to those in the free piston Stirling engine machine art, extends to component portions on both sides of the displacer 42, which are in communication through the regenerator 52.

In the operation of the conventional free piston Stirling machine illustrated in FIG. 2, the work space 48 experiences a pressure variation as a function of time as the power piston 40 and displacer 42 reciprocate in the cylinder 44. Consequently, the reservoir 54 is maintained at a pressure substantially near the minimum pressure of the work space 48 by fluid being drawn through the check valve 64. In the event the power piston 40 creeps sufficiently inwardly toward the work space 48 that the port 58 is uncovered at the top dead center extreme inward excursion position of the piston, then gas is drawn from the second space 50 into the reservoir 54 in the same manner as illustrated in FIG. 1. Consequently, the piston excursion beyond the TDC limit is prevented by the removal of gas from the second space 50 and the addition of that same gas to the work space 48.

Figure 3:
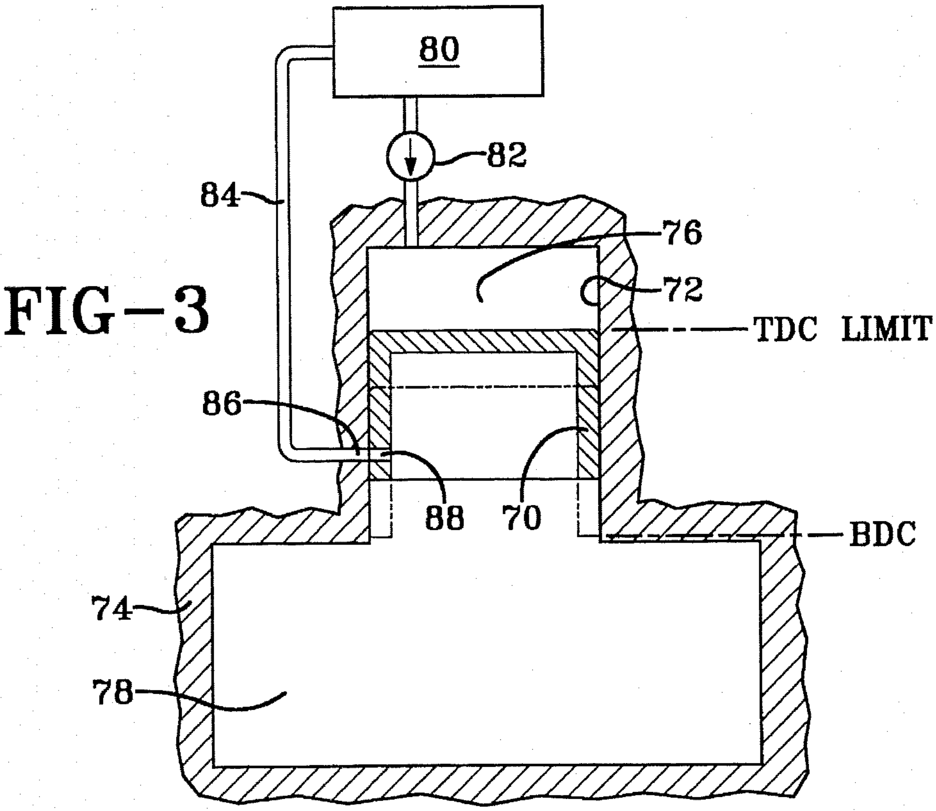
FIG. 3 is a diagrammatic illustration of a piston having its end position limited by means of an apparatus including an intermediate port through the piston.

FIG. 3 illustrates that it is not necessary that the port be uncovered by the actual physical end or skirt of the piston passing beyond the port. In FIG. 3 a hollow piston 70 reciprocates in a cylinder 72 formed in a housing 74. The housing also defines a work space 76 and second space 78, separated by the piston 70. As in FIGS. 1 and 2, the reservoir 80 is connected to the work space 76 through a check valve 82 and is also connected to a passageway 84. However, in the embodiment of FIG. 3, the passageway ends in a port 86 in the cylinder 72 which comes into registration with a port 88 through the wall of the hollow piston 70. Consequently, the embodiment of FIG. 3 limits the motion of the piston 70 to a selected TDC limit in a similar manner as piston position is limited in the embodiments of FIGS. 1 and 2 by uncovering a port and exposing it to the second space through the port 88 in the piston 70.

Figure 4:
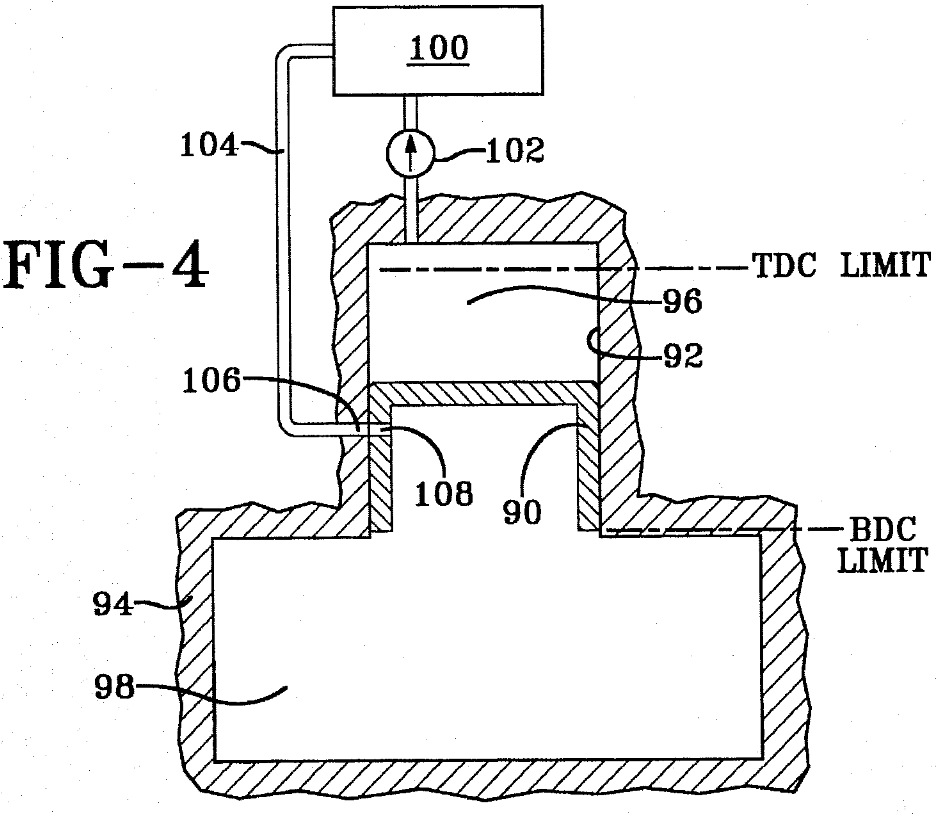
FIG. 4 is a diagrammatic illustration of a free piston having its outward movement away from the work space limited by an intermediate port through the piston.

FIG. 4 illustrates that the present invention may also be utilized to limit the outward extreme position of the piston. In FIG. 4 the hollow piston 90 reciprocates in a cylinder 92 formed in a housing 94. The housing 94 also defines a work space 96 and a second space 98. A reservoir 100 is connected through a check valve 102 and to a passageway 104. The passageway 104 terminates in a port 106 formed in the cylinder in a manner similar to the preceding embodiments. A bore or port 108 is also provided through the wall of the hollow piston 90 for registration with the port 106 in the cylinder when the piston 90 reaches a selected BDC out limit. In FIG. 4 the check valve 102 is directed oppositely from the check valves in FIGS. 1–3 so that the reservoir 100 is maintained at a high pressure rather than a low pressure. The reservoir 100 is maintained at a pressure substantially above the average pressure of the work space 96 and the second space 98.

In the operation of the embodiment of FIG. 4, if the reciprocating piston 90 does not make an excursion sufficiently far to bring the port 108 into registration with the port 106, then the port 106 remains covered by the skirt of piston 90 during the entire cycle. The reservoir 100 is maintained at the relatively high pressure of the work space maximum pressure. However, if the piston 90 moves so that the port 106 is uncovered by the piston port 108, fluid may pass from the reservoir 100, through the passageway 104, into the second space 108. This transfer of gas into the second space 98 thus prevents the piston from moving further outwardly from the work space 96.

Therefore, for providing an in limit, the reservoir must be connected through a valve, such as check valve 82, to maintain the reservoir at a relatively low pressure, below the average pressure of the work space or second space. For maintaining an out limit, the valve, such as valve 102, must be arranged to maintain the reservoir, such as reservoir 100, at a relatively high pressure.

FIGS. 5–7 illustrate yet another embodiment of the invention and illustrate that the first valve connected between the reservoir and the work space may be another type of valve, such as a spool valve, instead of being confined to a check valve, as illustrated in FIGS. 1–4. Further, it can be a spool valve of the same type as illustrated in connection with the foregoing figures. This first valve, as stated above, must open only when the working fluid pressure varies sufficiently in one direction from the average pressure. For example, for establishing an in limit, the first valve must open when the working fluid pressure becomes substantially less than the average pressure.

In FIG. 5, the piston 110 reciprocates in a cylinder 112 formed in a housing 114. The housing 114 also defines a second space 116 and a work space 118. The embodiment of FIG. 5 is a compressor with a suction inlet 120 for incoming fluid connected to the reservoir 122. The reservoir 122 is connected through a passageway 124 to a port 126 through the cylinder 112 in the manner described in connection with the foregoing embodiments. Instead of a check valve as illustrated in FIGS. 1–4, the reservoir 122 is also connected through a passageway 128 to a second port 130 through the wall of cylinder 112. The second port 130 is located at a position where it will be uncovered by the piston and exposed to the work space when the piston is located a selected distance outwardly from the work space beyond a mean position of the first end 132 of the piston 110. This port position assures that the reservoir 122 will be connected through the passageway 128 to the work space 118 only during a low pressure portion of the pressure cycle of the fluid in the work space 118. Gas is drawn into the work space by the piston so that the gas may be pumped out during the compression portion of the cycle through the check valve 144. As in the previous embodiments, the end limiting port 126 is positioned to be uncovered when the piston 110 reaches its TDC limit. Also, as with the previous embodiment, uncovering of the port 126 withdraws fluid from the second space 116 into the low pressure suction reservoir 122 and consequently removes fluid and thereby prevents further movement of the mean position of the piston 110 inwardly toward the work space 118.

FIG. 6 illustrates the displacement of piston 110 as a function of time or phase angle, which is an approximate sinusoidal motion.

FIG. 7 illustrates the pressure variations in the work space 118 as a function of time or phase angle as related to the piston displacement of FIG. 6. As the piston moves from its mean position toward top dead center, the pressure is increased along curve A until the exhaust check valve 134 is opened. After check valve 134 is opened, a short constant pressure interval occurs during which compressed fluid passes out of the compressor work space 118. When the piston passes its TDC position and begins to move outwardly, the resulting reduction of pressure in the work space 118 permits exhaust check valve 134 to close and the pressure in the work space 118 is reduced along curve B. As the port 130 is uncovered at point C, the pressure in the work space increases to the suction pressure of reservoir 122 and remains at that pressure until the piston 110 reaches its BDC position and begins movement inwardly at point D. Thereafter the pressure continues increasing in the work space 118 along curve A' and the cycle then is repeated.

Figure 8:
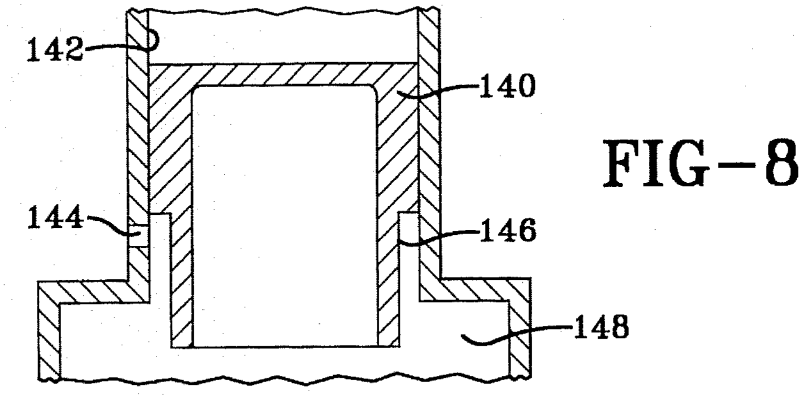
FIG. 8 is yet another alternative embodiment of the invention illustrating a compressor utilizing the suction chamber of a compress or simultaneously and additionally in connection with the present invention and also illustrating an additional structure for use with the present invention to maintain the end position limit despite an unusually large rate of pressure change.

FIG. 8 illustrates yet another port arrangement for the in limiting port. It shows that not only is it unnecessary that the port be uncovered by the actual physical end of the piston in the manner illustrated in FIG. 1 or be uncovered by a port through the piston in the manner illustrated in FIG. 3, but the port may be uncovered by an undercut formed on the piston. In FIG. 8 the piston 140 reciprocates in a cylinder 142. The end limiting port 144, functionally serving the purpose of port 30 for example in FIG. 1, comes into registration with the undercut 146 formed on the piston 140. Consequently, the port 144 is connected in communication with the second space 148 through the space between the undercut 146 and the wall of cylinder 142.

Figure 9:
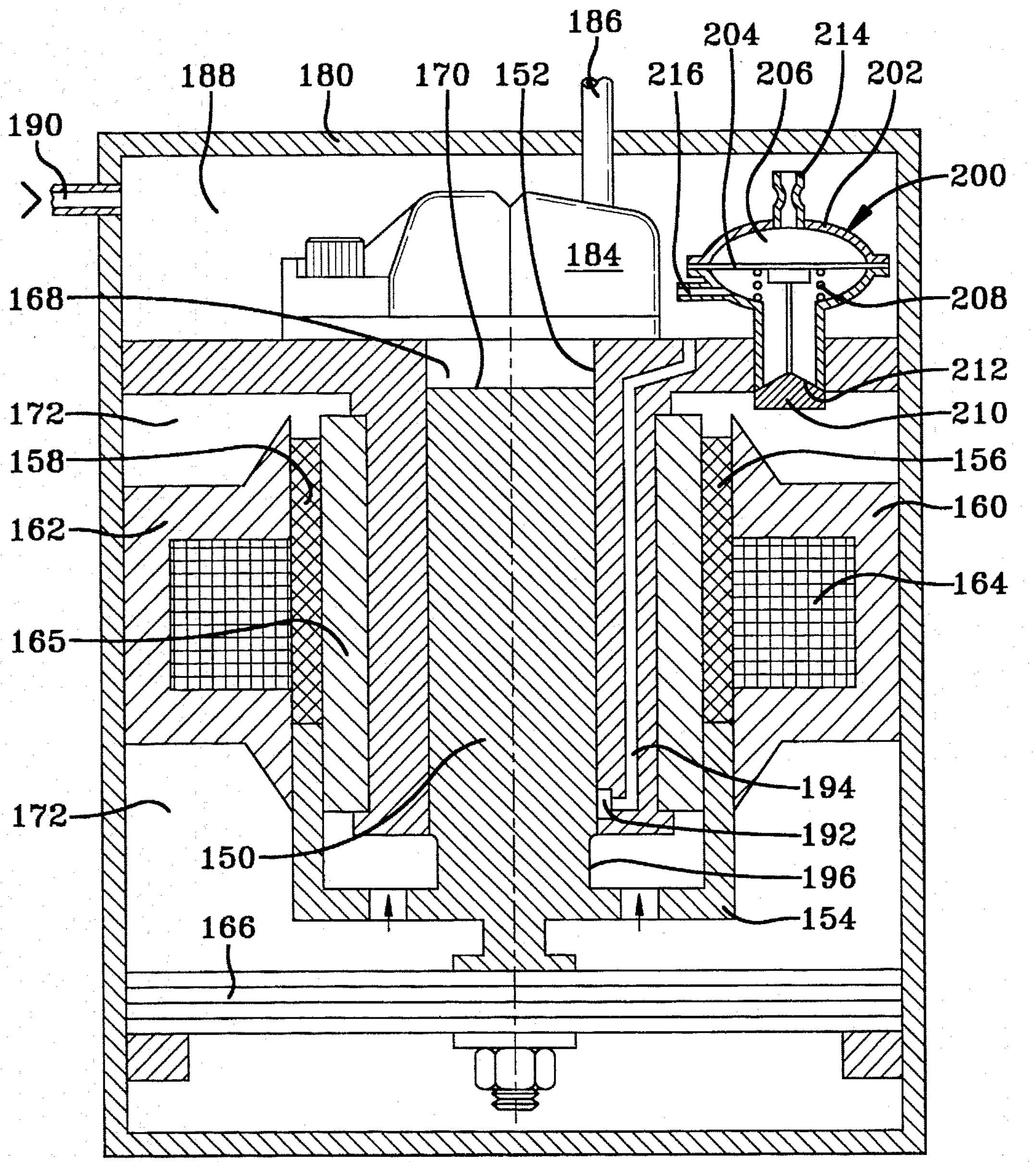
FIG. 9 illustrates an alternative structural component of the present invention for limiting the movement of the position of the reciprocating piston to an end limit inwardly toward the work space.

FIG. 9 illustrates a portion of a compressor embodying the present invention. A piston 150 reciprocates within a cylinder 152. Mounted to the piston 150 by means of a spider 154 are a plurality of permanent magnets 156 and 158. These permanent magnets reciprocate within pole pieces 160 and 162 containing an electrical winding 164. A low reluctance, ferromagnetic, cylindrical segment 165 fixed about the external portion of the cylinder 152 provides a low reluctance magnetic path on the opposite side of the magnets 156 and 158 from the pole pieces 160 and 162. Together the magnets, pole pieces, cylindrical segment and windings form the linear motor which drives the piston 150 in reciprocation. A spring 166 is also mounted to the piston to provide for resonant reciprocation at the desired operating frequency. The spring 166 is a stack of conventional planar springs attached at their center to the piston 150 and at their periphery to the housing 180. A first work space 168 is formed at a first end 170 of the piston and the second back space 172 is formed in the remainder of the housing 180. A conventional valve plate and manifold 184 is mounted at the end of the cylinder 152 and includes (internally and not visible) a check valve for the passage of compressed fluid from the work space 168 into the manifold 184 and out the discharge line 186. Within the housing 180, but surrounding the manifold 184, is the suction chamber 188 which is connected to a source of incoming low pressure fluid by a suction line 190.

The movement of the piston 150 inwardly toward the work space 168 is limited by providing an end limiting port 192 near the outer end of the cylinder 152. The port 192 is connected to the suction chamber 188 by a passageway 194 formed through the interior of the cylinder 152. In this embodiment, the port 192 is positioned to open and be exposed to the second space 172 by means of the undercut 196 in the manner illustrated in connection with FIG. 8. In this embodiment, the suction chamber 188 also functions as the reservoir of the invention to withdraw fluid from the second space 172 if the piston 150 moves inwardly to its in limit and uncovers the port 192 to permit gas to be withdrawn from the second space 172 into the suction chamber in the manner described above.

One difficulty with embodiments of the invention is that the withdrawal of fluid from the second space, to prevent movement of the piston beyond the end limit, is gradual because the port, such as the port 192, is uncovered for only a brief interval while the piston is at its TDC position. Provision is therefore made for permitting a rapid movement of fluid from the second space to the reservoir in the event of a sudden or transient, unusually high rate of change of suction pressure. Such a quick dump feature is accomplished by the equalizer structure 200 encircled in phantom in FIG. 9.

The equalizer 200 has a third valve which is connected for communication between the suction chamber 188 and the second space 172. In effect, this third valve of the equalizer provides a high flow rate fluid flow path which is parallel (in a schematic circuit sense) to the path provided through passageway 194 and port 192 when the port 192 is uncovered. A valve actuator is connected to this third valve for opening the third valve in response to a time rate of pressure change in the suction reservoir 188 which exceeds a selected rate of pressure change.

More specifically, the equalizer 200 has a housing 202. The valve actuator includes a diaphragm 204 mounted in the housing 202 and bounding a chamber 206. A helical spring 208 biases the diaphragm 204 in an upward direction to hold a valve 210 upwardly and sealingly against its valve seat 212. The chamber 206 is sealed except for a small, flow restricting orifice 214 communicating between the chamber 206 and the suction reservoir 188. The space beneath the diaphragm 204 is ported to the suction reservoir 188 by an opening 216, which is not a flow restricting orifice.

In normal operation of the equalizer 200, the two sides of the diaphragm 204 are exposed to the same pressure, i.e. the suction pressure. The spring 208 exerts sufficient force to bias the valve 210 against its valve seat 212 and prevent communication between the suction reservoir 188 and the second space 172. The equalizer chamber 206 will consequently be at the suction pressure as a result of long term of communication with the suction reservoir through the orifice 214.

However, in the event of a sudden or transient substantial reduction of pressure within the suction reservoir 188, the pressure in the equalizer chamber 206 will not change very rapidly because the gas in the chamber 206 cannot escape rapidly through the flow limiting orifice 214 which has, for example, an orifice diameter of 0.2 mm. Consequently, the sudden reduction in suction pressure permits the higher pressure in the equalizer chamber 206 to overcome the spring bias and move the diaphragm 204 downwardly to lower the valve 210 from its valve seat 212 and open the valve 210 permitting substantial flow of gas from the second space 172 through the equalizer and its large opening 216 into the suction reservoir 188. This allows a relatively large quantity of fluid to be transported from the second space 172 into the suction reservoir 188, thus preventing the piston 150 from travelling further inwardly during its cyclical operation. However, after a brief time delay determined by the size of the orifice 214, which determines the flow rate through the orifice 214, the pressure in the equalizer chamber 206 will be reduced so that the pressure differential across the diaphragm is reduced and the spring then overcomes that pressure differential and closes the valve 212.

Therefore, the end position of the piston 150 is limited in its inward movement not only regardless of the slow leakage of fluid around the piston from the work space 168 to the second space 172 in a gradual manner, but is also limited in the event of a sudden or transient high rate of suction pressure change.

While certain preferred embodiments of the present invention have been disclosed in detail, it is to be understood that various modifications may be adopted without departing from the spirit of the invention or scope of the following claims.

We claim:

1. A piston end-position limiter for a free piston machine having a housing with a cylinder and a piston sealingly reciprocatable in the cylinder, the housing enclosing a first space bounded by a first end of the piston, the housing also having a second space bounded by the opposite second end of the piston, the second space containing a working fluid having an average pressure and the first space also containing working fluid having a pressure periodically varying in opposite directions from said average pressure, the limiter comprising:

(a) a fluid reservoir;

(b) a first valve connected in communication between the reservoir and the first space, said first valve adapted to open only when the working fluid pressure in the first space varies sufficiently in one direction from the average pressure; and (c) a second, position responsive valve connected in continuously open fluid communication to the reservoir and connected to the second space, the second valve being operatively linked to the piston for opening to connect the second space to the reservoir in response to the piston reaching a selected end limit of its reciprocation.

2. A piston limiter in accordance with claim 1 wherein the first valve comprises a port opening into the cylinder, connected in communication to the reservoir and uncovered by the piston and exposed to the first space when the piston is located a selected distance outwardly from the first space.

3. A piston limiter in accordance with claim 2, wherein the free piston machine is a compressor and said port is also connected to a source of working gas to form a suction port into the compressor beyond a mean position of the piston.

4. A piston limiter in accordance with claim 1 wherein the first valve is a check valve directed to permit fluid flow from the reservoir to the first space to maintain the reservoir at a pressure less than the average pressure of the second space and wherein said selected limit is a limit of piston reciprocation inwardly of the first space.

5. A piston limiter in accordance with claim 4 wherein the second valve includes a passageway communicating from the reservoir to a port opening into the cylinder, the port being through a wall of the cylinder at a position which is uncovered by the piston and exposed to the second space when said selected limit is reached.

6. A piston limiter in accordance with claim 5 wherein the port is positioned beyond the second end of the piston when said selected limit is reached.

7. A piston limiter in accordance with claim 5 wherein the free piston machine is a compressor, the check valve is an intake check valve of the compressor and the fluid reservoir is a suction reservoir of the compressor.

8. A piston limiter in accordance with claim 5 wherein the free piston machine is a Stirling cycle machine and the first space is the work space of the machine containing a displacer.

9. A piston limiter in accordance with claim 1 wherein the first valve is a check valve directed to permit fluid flow from the first space to the reservoir to maintain the reservoir at a pressure greater than the average pressure of the second space and wherein said selected limit is a limit of piston reciprocation outwardly from the first space.

10. A piston limiter in accordance with claim 9 wherein the second valve includes a passageway communicating from the reservoir to a port opening into the cylinder, the port being through a wall of the cylinder at a position which is uncovered by the piston and exposed to the second space when said selected limit is reached.

11. A piston limiter in accordance with claim 1 and further including an equalizer for responding to a selected rate of change of reservoir pressure with respect to time, the equalizer comprising a third valve connected for communication between the reservoir and the second space and a valve actuator connected to the third valve and opening the third valve in response to a time rate of reservoir pressure change in excess of said selected rate.

12. A piston limiter in accordance with claim 11 wherein the valve actuator comprises a diaphragm linked to the third valve and biased to close the valve, the diaphragm having a first side and an opposite side and linked to the third valve for opening the third valve in response to the pressure on the first side sufficiently exceeding the pressure on the second side to overcome the bias, the first side of the diaphragm being exposed to a chamber which is vented to the reservoir through a flow rate limiting restriction and the opposite side of the diaphragm being vented without restriction to the reservoir.

13. A piston end-position limiter for a free piston machine having a housing with a cylinder and a piston sealingly reciprocatable in the cylinder, the housing enclosing a first space bounded by a first end of the piston, the housing also having a second space bounded by the opposite second end of the piston, the second space containing a working fluid having an average pressure and the first space also containing working fluid having a pressure periodically varying in opposite directions from said average pressure, the limiter comprising:

(a) a fluid reservoir;

(b) a first valve connected in communication between the reservoir and the first space, said first valve adapted to open only when the working fluid pressure in the first space varies sufficiently in one direction from the average pressure;

(c) a second valve connected to the reservoir and connected to the second space for opening to connect the second space to the reservoir in response to the piston reaching a selected end limit of its reciprocation: and (d) an equalizer for responding to a selected rate of change of reservoir pressure with respect to time, the equalizer comprising a third valve connected for communication between the reservoir and the second space and a valve actuator connected to the third valve and opening the third valve in response to a time rate of reservoir pressure change in excess of said selected rate.

14. A piston limiter in accordance with claim 13 wherein the valve actuator comprises a diaphragm linked to the third valve and biased to close the valve, the diaphragm having a first side and an opposite side and linked to the third valve for opening the third valve in response to the pressure on the first side sufficiently exceeding the pressure on the second side to overcome the bias, the first side of the diaphragm being exposed to a chamber which is vented to the reservoir through a flow rate limiting restriction and the opposite side of the diaphragm being vented without restriction to the reservoir.

* * * * *